Sept. 16, 1952    H. E. BECK ET AL    2,610,634
CORN HUSKER ROLL
Filed Jan. 26, 1949    2 SHEETS—SHEET 1
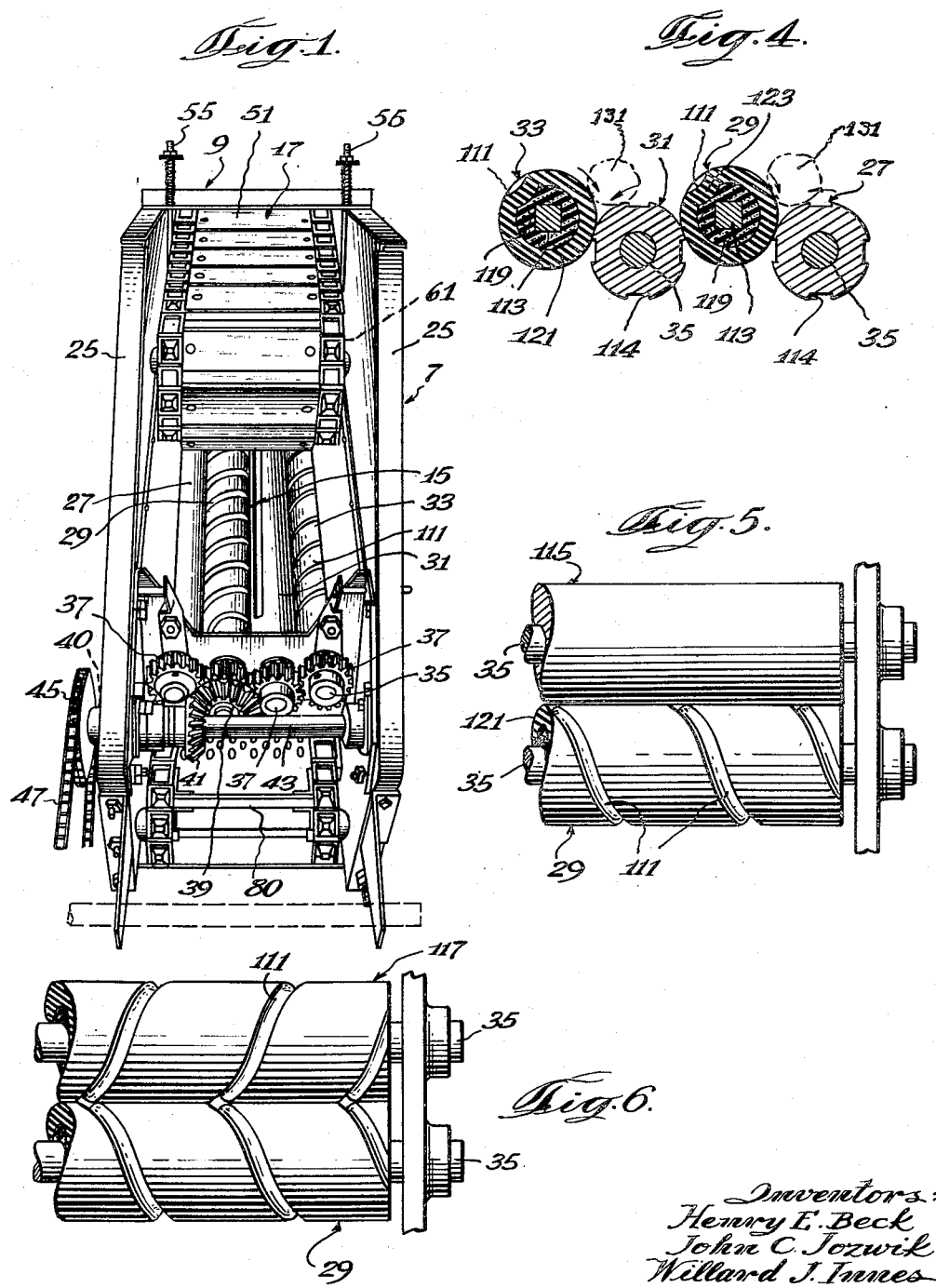
Inventors:
Henry E. Beck
John C. Jozwik
Willard J. Innes
By Soans Pond & Anderson
Attorneys

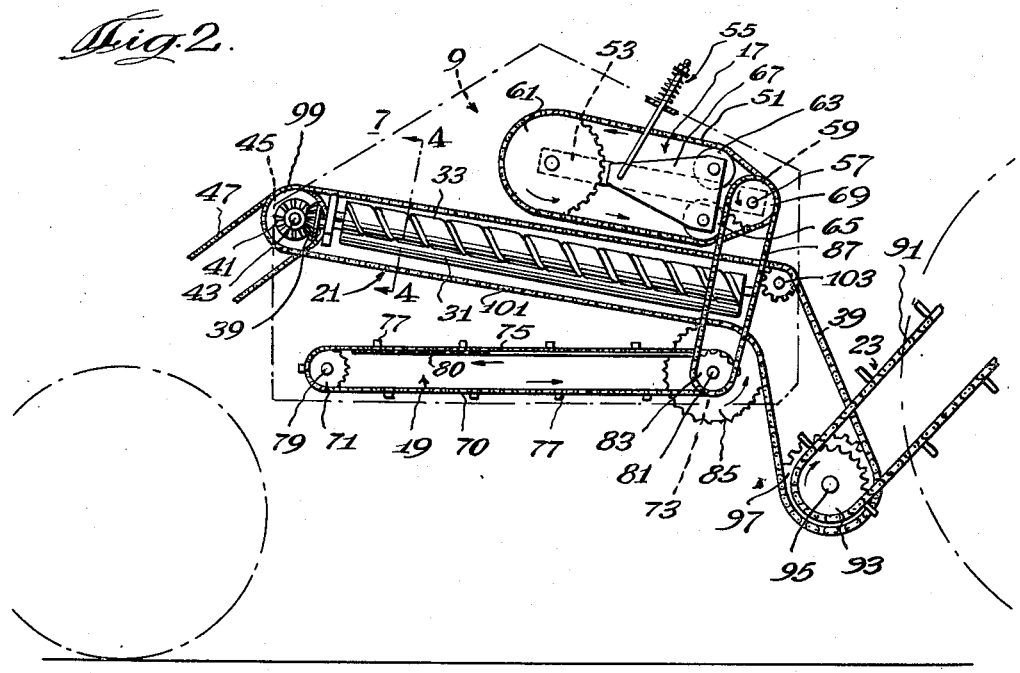
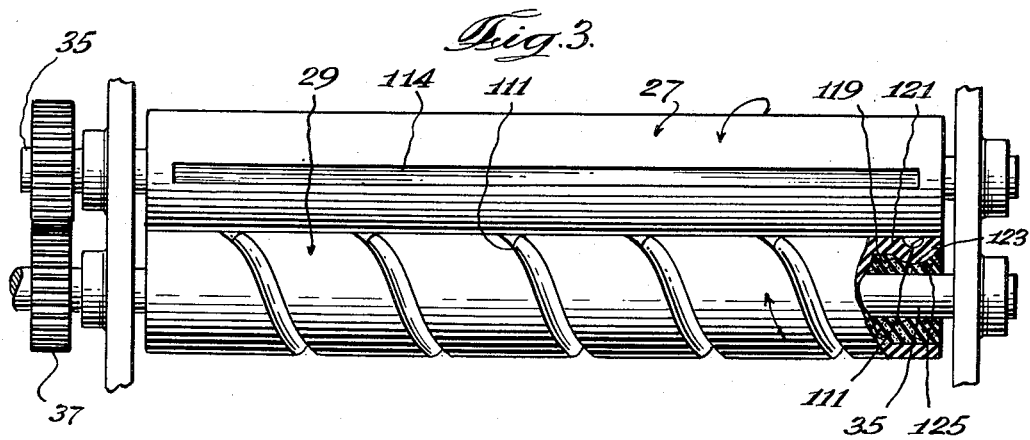

Patented Sept. 16, 1952

2,610,634

UNITED STATES PATENT OFFICE 2,610,634

CORN HUSKER ROLL

Henry E. Beck, Racine, Wis., John C. Jozwik, State College, N. Mex., and Willard J. Innes, Racine, Wis., assignors to J. I. Case Company, a corporation of Wisconsin Application January 26, 1949, Serial No. 72,852

1 Claim. (Cl. 130—5)

The present invention relates generally to corn harvesting apparatus and has particular relation to the husking roll mechanism used in connection with this apparatus.

In conventional corn husking apparatus, the picked ears of corn are deposited on a bed of rapidly turning rolls, arranged in cooperating pairs with each roll rotating oppositely to the immediately adjacent roll. The cooperating rolls engage the husks in one or more of the nips which exist along the line of tangential contact between the cooperating rolls. The counter rotation of these rolls causes the husks to be stripped from the ears of corn, and to be deposited below the rolls. During the husking operation, ears of corn are caused to move longitudinally along the bed of rolls to a conveyor or other disposal means.

Many difficulties have been encountered in carrying out the husking operation outlined above by the use of the husking mechanisms known prior to the present invention. In particular, a relatively large quantity of corn was often shelled during the husking operation and in some devices there was considerable bruising of the kernels. Also, the use of the previously known husking mechanisms has been somewhat limited due to the fact that husking must be accomplished when the moisture content of the corn is within a limited range. If the corn is too dry, some conventional husking mechanisms tend to tear the husks instead of stripping them from the ears and may shell the corn excessively. On the other hand, if the corn is not sufficiently dry, the heretofore known machines may bruise and damage the kernels causing the corn to rot and mold. Another particularly troublesome difficulty encountered in the prior art husking machines arose from the unsuitability or inadequacy of the mechanism provided for accomplishing lateral yielding of the cooperating husking rolls when an undeveloped ear, piece of cob or other trash became caught therebetween.

A further difficulty encountered through the use of presently known mechanisms is the accomplishment of continued stripping action in the course of husking operations when a relatively large object passes between the husking rolls. Since conventional husking rolls are fabricated from non-resilient materials, lateral yielding of the rolls is frequently provided through supporting the rolls in bearings which are urged together by resilient means. The mechanical difficulties in providing such support and driving means for the rolls are readily apparent, but the resulting inefficient husking operation is of more importance to the operator.

The principal object of the present invention, therefore, is to provide an improved husking mechanism for use in apparatus of the class described which is capable of surmounting the above mentioned difficulties. As will hereinafter appear, this object is accomplished by the provision of an improved husking roll which may be used in combination with similar or other rolls to obtain the improved operation. An additional object of the invention is the provision of a husking mechanism which is adapted to pass relatively large material between the rolls comprising the husking bed without impairing the stripping action of the mechanism. Further and more specific objects of our invention include provision of an improved husking roll, in accordance with the above object, which will be relatively inexpensive to manufacture, quiet in operation, capable of operation for long periods of time under adverse operating conditions, and able to operate from a direct, positive, drive connection. Other objects and advantages of the invention will be made more apparent by reference to the accompanying drawings and the succeeding description of certain preferred embodiments thereof.

In the drawings:

Fig. 1 is a perspective view of a typical husking unit having a roll bed which includes husking rolls in accordance with the invention;

Fig. 2 is a diagrammatic, side elevational view of the husking unit shown in Fig. 1;

Fig. 3 is a fragmentary, plan view of one pair of cooperating husking rolls shown in Fig. 1;

Fig. 4 is a sectional, end view of the rolls taken along line 4—4 in Fig. 2; and Figs 5 and 6 are fragmentary, plan views showing two different combinations of husking rolls in accordance with the invention.

The husking rolls of the invention may be incorporated in any of the various types of corn husking mechanisms having cooperating pairs of rolls for accomplishing the husking operation. While the husking mechanism may constitute a part of a corn harvesting apparatus, it may be a separate stationary unit. The particular corn husking unit which is illustrated at 7 in the drawings is of a type which is adapted for use with a tractor supported corn harvester. The frame structure 9 of the husking unit 7 is fabricated from suitable angle, channel and plate sections, and is adapted to support the various operative elements of the unit. These elements include the cooperating rolls which define a husking bed 15 and a slat conveyor 17 which is resiliently supported in an overlying relation with respect to the bed. Another slat type conveyor 19 is disposed below the husking bed 15 and is adapted to remove the corn husks and other foreign material which drops thereon during the husking operation. This conveyor 19 is further adapted to separate corn kernels from the husks and other foreign material that pass between the rolls during harvesting. The unit 7 also includes coacting sprocket, gear, and drive chain mechanism, indicated generally at 21 for activating the various moving parts. A disposal means 23, which may be a belt conveyor, is provided rearward of the husking bed 15, whereby the husked corn is removed from the husking unit 7.

A pair of spaced-apart side members 25 define a passageway which is adapted to receive the picked ears of corn, and these side members 25 are fastened to, and supported upon, the main frame 9. The husking bed 15 forms a base or bottom for this passageway and includes the rolls 27, 29, 31 and 33 which comprise two cooperating pairs. The rolls 27, 29, 31 and 33 are positioned with their longitudinal axes generally parallel but are disposed in staggered relation. In particular rolls 27 and 31 are vertically offset below rolls 29 and 33 as shown in Fig. 4. During normal operation, these rolls are so disposed that the longitudinal axes thereof are inclined downwardly from the corn-inlet or forward end. This arrangement of the rolls causes the corn deposited on the bed 15 to be moved rearwardly in the husking unit 7.

Each husking roll 27, 29, 31 and 33 is supported upon a shaft 35 which projects from the opposite ends of the associated roll. The projecting ends of the shafts 35 are journalled in suitable bearings which are attached to the main frame structure 9. Simultaneous rotation of the cooperating husking rolls is accomplished by four spur gears 37, each of which is attached to the forward end of one of the roll-supporting shafts 35. This end of each of the shafts 35 is of sufficient length to permit the gears 37 to be disposed forwardly of the roll bearings provided at the forward end of the rolls 27, 29, 31 and 33. The spur gears 37 are in direct engagement with each other whereby the rotation of each roll is inverted and translated to the adjacent roll.

A bevel gear 39 is attached to the shaft of roll 29 forwardly of the spur gear 37, as is shown in Fig. 1. This bevel gear 39 registers with another bevel gear 41 keyed to a transversely extending shaft 43 which is journalled in suitable bearings attached to the main frame structure 9. A sprocket 45 is keyed to the shaft 43 outward of the main frame structure 9 (Fig. 1), and is adapted to be engaged by a suitable drive chain 47 which is connected to the main driving means for the apparatus.

The conveyor mechanism 17 includes an endless cross slat type conveyor 51 and a frame structure 53 which extends generally longitudinally of the husking unit 7 and which is resiliently supported on the main frame 9. The resilient support of the frame structure 53 is accomplished by means of a pair of compression spring supports or counter balances 55 which are attached to the forward portion of the structure (Fig. 2). The rearward portion of the structure 53 is rotatively supported on a transversely extending shaft 57 which is also adapted to support a pair of driving sprockets 59 for the conveyor 51. A pair of large sprockets 61 are rotatively supported on the forward end of the conveyor frame structure 53. These sprockets 61 are adapted to support the cross slat conveyor 51 and define the forward limit of travel of this conveyor.

The conveyor mechanism 17 is suitably tensioned by means of two pairs of resiliently supported sprockets 63 and 65 which are disposed intermediate the large sprockets 61 and driving sprockets 59 and which are rotatably attached, one pair above the other, to the rearward portion of a spring supported structure 67, as is illustrated in Fig. 2. The spring support for this structure 67 is accomplished by attaching the forward portion to the compression spring supports 55 in a manner such that the tensioning sprockets 63 and 65 may move up and down independently of the conveyor frame structure 53 and the large forward sprockets 61.

The shaft 57 which supports the driving sprockets 59 of the conveyor mechanism 17 is rotated by a sprocket 69 which is fixedly attached thereto. This sprocket 69 is disposed on the right end of the supporting shaft 57 (Fig. 2) and is adapted to connect to the main driving means 21 of the husking unit 7. Through the above described arrangement of parts, the conveyor mechanism 17 is adapted to effectively press the ears of corn into engagement with the husking rolls 27, 29, 31 and 33.

Conveyor 19 which is disposed below the husking bed 15 and which is adapted to separate the loose corn from the husks and other foreign material falling from the bed during the harvesting operation, comprises an endless slat-type conveyor assembly 70 which is supported, during normal operations, generally horizontally on a pair of idler sprockets 71 and a pair of driving sprockets 73 disposed rearwardly of the idler sprockets (Fig. 2). The conveyor assembly is of a well known type and includes a pair of spaced, longitudinally extending chains 75 having a plurality of spaced, transversely extending slats 77 attached therebetween. The idler sprockets 71 are supported on a transversely extending shaft 79 which is journalled in suitable bearings provided on the main frame structure 9. A perforated plate or pan 80 is attached to the main frame 9 intermediate the idler sprockets 71 and the driving sprockets 73 immediately below the upper run of the chain 75. The grain passes through the perforations and suitable means are provided for proper disposal of the grain.

The pair of driving sprockets 73 are keyed to a transversely extending shaft 81 which is also journalled in suitable bearings disposed on the main frame structure 9. This latter shaft 81 supports sprockets 83 and 85, one of which is adapted to engage the main driving means 21 and the other of which is operatively connected to the sprocket 69 which is adapted to drive the resiliently supported slat conveyor 17. This operative connection is accomplished by means of a chain 87 which transmits the power from the main driving means 21 of the husking unit 7 to the upper conveyor unit 51.

A particular disposal means, which comprises a conveyor 23, is shown in the drawings rearward of the husking bed 15. The conveyor 23, which is adapted to convey the husked corn from the husking unit 7 is illustrated as being disposed to the rear of the unit in position to receive the husked ears as they drop from the roll bed 15.

This disposal means is of a well known type and the conveyor includes an endless belt elevator 91 which is adapted to travel upwardly and rearwardly from a pair of driving sprockets 93. These sprockets 93 are attached to a transversely extending shaft 95, to which is keyed a driving sprocket 97 adapted to be connected to the main driving means 21.

The main driving means 21 includes a source of power (not shown), a pair of sprockets 45 and 99 which are keyed to the transverse shaft 43 disposed forwardly of the husking bed 15, an endless driving chain 101 and the connecting power chain 47. The power chain 47 connects the source of power to the sprocket 45, thereby rotating the shaft 43 and causing the husking rolls 27, 29, 31 and 33 to rotate. The other sprocket 99, as pointed out, is keyed to the same shaft 43 and is adapted to register with the main driving chain 101. The chain 101 travels rearwardly from the sprocket 99 to an idler sprocket 103 journalled in suitable bearings provided in the main frame structure 9. The driving chain 101 then passes around the elevator driving sprocket 97, returns forwardly, and engages the sprocket 85 which is adapted to drive the slat conveyors 17 and 19. Through this arrangement, all of the operative elements of the husking unit 7 are driven concurrently.

At times, it may be desirable to use other disposal means than that illustrated in Fig. 2. For example, a receptacle may be disposed below the outlet end of the husking bed 15. When this is done, it will be necessary to substitute an idler sprocket for the elevator driving sprocket 97, illustrated in the drawings, in order to maintain proper timed relation between the various other driving sprockets.

As previously noted, the present invention is particularly concerned with the construction of husking rolls, used in husking mechanisms of the class described. These rolls may be of varying lengths and diameters, but for optimum husking efficiency the roll diameter will be in the range of between from about 2 to 4 inches. Such proportioning of the husking rolls provides efficient husking and minimizes damage to the ears being husked.

Heretofore, it has been the practice to employ cooperating rolls made of steel or similar material having indentations of various designs formed therein. In contrast with these arrangements, the present invention contemplates the use, in each of the cooperating roll pairs, of at least one resilient roll having flutes or other indentations of various designs formed in the surface thereof. A particularly efficient resilient husking roll is manufactured with a helical flute formed on its surface as shown particularly at 111 in Figs. 1, 3, 5 and 6. The roll 29 is preferably of fabricated construction having a shaft 35 of strong, relatively rigid material, such as steel, and at least one layer of resilient material, which can be a rubber compound, disposed about the shaft 35. In cross-section the shaft 35 may be round, but, a multi-sided shaft, as illustrated at 113 in Fig. 4, is somewhat more desirable in that it will tend to keep the immediately adjacent resilient material from turning with respect to the shaft 113.

The helically fluted resilient roll 29 can be used with various types of cooperating rolls, however, the preferred combination is shown in Figs. 1 and 3, wherein the spirally fluted resilient roll 29 is used in combination with a steel roll 27 having a plurality of spaced-apart, longitudinally extending flutes 114 formed therein. Some alternate combinations are shown in Figs. 5 and 6 wherein the helically fluted resilient roll 29 is paired with a resilient or a rigid roll 115 having a smooth cylindrical surface (Fig. 5), or with another spirally fluted roll 117 which likewise may be of resilient or rigid material (Fig. 6).

It is necessary that the resilient husking roll have sufficient resilience to allow the passage of an underdeveloped ear of corn or other foreign material between the cooperating rolls. At the same time it must not be so resilient as to prevent efficient husking action. In general, it appears that satisfactory results may be achieved through the use of a roll having a relatively thick layer of molded rubber or like material disposed about the supporting shaft. It is desirable that the resilient layer have a hardness in the range of from about 60A Durometer after 10 seconds to 95A Durometer after 10 seconds, determined by a Type A Durometer test instrument.

The above mentioned type A Durometer, used to measure the hardness of the rubber comprising the resilient rolls, is an instrument that is recognized by the American Society of Testing Materials and the rubber industry generally. It has been recommended by the A. S. T. M. for the determintaion of the hardness of rubber and like materials. The recommendation is tentative and has been given number D–676. However, the "tentative" designation merely indicates that the procedure for operation of the apparatus is not definitely settled. Consequently, a description of the procedure adopted for the measurements used herein will be set forth.

In the present determinations, a type A Durometer has been used with a load of 2 pounds for all measurements. The load is translated to an inverted frusto-conical impresser point which presses into the rubber to be tested varying distances depending upon the rubber's hardness. The tip of the point used had a diameter of .031 inches and the point flared outwardly to a diameter of .052 inches. The sides of the frusto-conical point converge at an angle of 35°. The point was allowed ten seconds to penetrate into the rubber surfaces tested. The extent of the penetration was measured by a standard meter used with Durometers, and the reading taken from this meter indicated the hardness of the rubber tested.

While a roll having a single layer of resilient material gives good results, particularly satisfactory results are obtained when the shaft covering is of a duplex or of a multi-layer type, as for example the construction shown in Figs. 3 and 4. This roll, designated 29, has an inner layer 119 composed of a relatively soft rubber compound having a Durometer reading in the range of between about 30A Durometer after 10 seconds and 60A Durometer after 10 seconds, and has an outer layer 121 composed of a relatively hard rubber compound having a Durometer reading in the range of between about 60A Durometer after 10 seconds and 100A Durometer after 10 seconds. The outer layer 121 of resilient material envelops the inner layer 119 and is desirably of uniform thickness throughout the roll surface. The helical flute 111 is formed in the outer surface of the roll 29, and as a result of the formation of this flute 111 and the requirement of uniform thickness of the outer layer 121 a protrusion or rib 123 is formed on the inner surface of the outer layer 121. The inner layer 119 has a spiral flute 125 formed in its outer surface adapted to register with the rib 123 formed in the inner surface of the outer layer 121. The rib 123 engages the flute 125 on the inner layer 119 and aids in the binding of the relatively hard outer layer 121 to the soft inner layer 119. The inner layer 119 is vulcanized or otherwise attached to the shaft 35 or 113.

For more satisfactory operation in existing types of corn husking units, i. e., units having rolls with outer diameters in the range of from about 2 to 4 inches, the thickness of the inner resilient layer 119 of the duplex roll 29 should be about two to about six times the thickness of the outer resilient layer 121 and it is preferable that the helical flutes 111 should be generally semicircular in cross section. However, the helical flutes 111 in the roll surface may be of varying depth and width, and the pitch of the flutes 111 formed in the roll 29 may be varied, depending upon the particular embodiment of the roll.

It is also possible to utilize a duplex roll 29 having an inner layer 119 of very soft rubber, such as sponge rubber, but this type of roll is of somewhat more limited operation due to its inherent mechanical characteristics than the previously described structure.

During the operation of the husking apparatus 7 illustrated in Figs. 1 and 2, the picked ears of corn shown at 131 in Fig. 4, are dropped on the bed 15 of rapidly turning, husking rolls 27, 29, 31 and 33, and the husks are engaged in nips provided along the line of tangential contact between rolls 29 and 31 and rolls 33 and 35. The resiliently supported slat conveyor 17 overlying the roll bed 15 aids in causing the husks to engage the nips.

The resilient rolls 31 and 33 provide a greater coefficient of friction, and cause more efficient engagement of the husks with the roll nips and, in addition, tend to decrease the shelling and bruising of the corn during husking. Once the husks are engaged between a pair of cooperating roll surfaces, i. e., between rolls 27 and 29 or between rolls 31 and 33, the counter-rotation of the rolls 27, 29, 31 and 33 strips off the husks. The bared ear then passes down the husking bed 15 to the disposal means 23. The husks are deposited on the slat-type conveyor 19 below the husking bed 15 and pass to other disposal means (not shown).

When a foreign object reaches the nips between a pair of cooperating rolls 27 and 29 or 31 and 33 lateral yielding, which is substantially independent of the inertia of the rotative parts, is provided as a result of the resilient layers 119 and 121 which comprise resilient rolls 29 and 33. If the foreign material experiences difficulty in passing between the cooperating rolls, the resilient material 119, 121 of rolls 29 or 33 may lag somewhat behind the rotation of the roll shaft 35 causing a peripheral storage of energy which when released provides a greater force for ejecting the slowed or temporarily lodged foreign material.

Having a roll of resilient material provides a further advantage due to the fact that the yielding and separation at the roll surfaces when a foreign object passes between the rolls 27 and 29 or 31 and 33 will closely approximate the length of that object. This allows the remainder of the nip between the cooperating rolls to continue in normal operation, resulting in a considerable increase in the efficiency of the husking operation.

From the foregoing description and discussion it is readily observed that the helically-fluted resilient husking roll of the invention makes possible a great improvement in husking operations and when used with a similar roll or other roll used in the art a more efficient stripping action results. The husking apparatus uses a minimum number of parts and in addition permits husking of corn with a minimum of shelling of the corn and damage to the kernels.

The various features of our invention which are believed to be new are expressly set forth in the appended claims.

We claim:

A husking roll adapted for use with apparatus of the class described, said roll including a supporting shaft and a pair of generally tubular shaped layers of resilient material which are disposed about said shaft in superposed relation, the inner of said layers being fabricated from a resilient material having a hardness in the range from about 30-A Durometer after ten seconds to about 60-A Durometer after ten seconds, the inner surface of said inner tubular shaped layer being attached to said shaft and the outer surface of said inner layer being of generally cylindrical shape and having a continuous flute formed therein which generally helically circumscribes said outer surface of said inner layer, the outer of said generally tubular shaped layers being proportioned to fit over said inner layer and having its inner surface provided with a rib which is adapted to register with the flute on the outer surface of said inner layer, the outer surface of said outer layer having a continuous flute formed therein which helically circumscribes said outer surface, said flute in said outer surface of said outermost layer being disposed radially outwardly from said rib whereby the resilient material of said outer layer has a substantially constant thickness, the material from which said outermost layer is fabricated having a hardness of from about 60-A Durometer after ten seconds to about 100-A Durometer after 10 seconds, and the outer diameter of said outermost tubular member being in the range of from about two to four inches.

HENRY E. BECK.
JOHN C. JOZWIK.
WILLARD J. INNES.

REFERENCES CITED

The following references are of record in the file of this patent:

UNITED STATES PATENTS

| Number | Name | Date |
| --- | --- | --- |
| 613,249 | Creider | Nov. 1, 1898 |
| 915,934 | Butler et al. | Mar. 23, 1909 |
| 1,659,371 | Merrill | Feb. 14, 1928 |
| 1,867,955 | Ryder | July 19, 1932 |
| 2,075,448 | Lundquist et al. | Mar. 30, 1937 |
| 2,179,579 | Morral et al. | Nov. 14, 1939 |
| 2,239,899 | Nightenhelser et al. | Apr. 29, 1941 |
| 2,308,102 | Paradise et al. | Jan. 12, 1943 |